J. WRIGHT, Jr.
Refining Sugar.
No. 33,674. Patented Nov. 5, 1861.
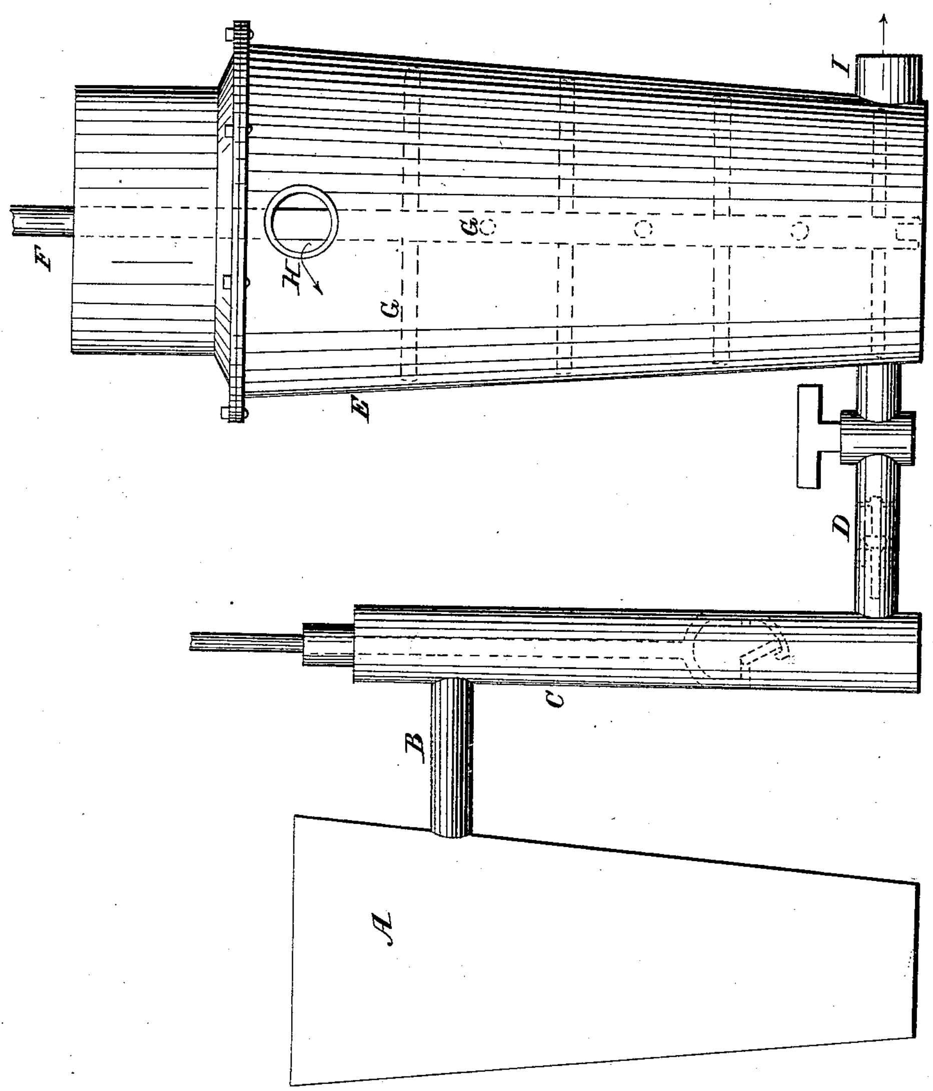
WITNESSES:
Chas. Hadaway
Bernard Drew
INVENTOR:
John Wright Jr.
By his Atty.
T. Dennis Jr.
N. PETERS. Photo-Lithographer, Washington, D. C.

UNITED STATES PATENT OFFICE.

JOHN WRIGHT, JR., OF NEW YORK, N. Y.

IMPROVEMENT IN PROCESSES OF REFINING AND PURIFYING SUGAR.

Specification forming part of Letters Patent No. 33,674, dated November 5, 1861.

*To all whom it may concern:*

Be it known that I, JOHN WRIGHT, Jr., of the city, county, and State of New York, have invented or discovered a new, useful, and Improved Process for Refining and Purifying Crude or Brown Sugar—that is, sugar which has not been redissolved or refined; and I do hereby declare that the best mode which I have discovered for performing said process is described in the following specification, with the best apparatus which I have devised or found for performing said process.

The nature of my invention and improvement in refining or purifying crude or brown sugar consists in applying alcohol, white liquor, or other liquid used to wash the sugar at or near the bottom of the vessel containing the sugar, so as to flow up through the mass of sugar and carry up, float out, and carry off any impurities and extraneous matter lighter than the sugar, and such other matter or substances as may be dissolved by the alcohol, white liquor, or other liquid used to wash the sugar.

To enable others skilled in the art of refining sugar to use the improved process which I have invented or discovered, I will proceed to describe the mode of performing said process, with the apparatus I use for that purpose.

In the accompanying drawing of said apparatus, A is a vessel to be supplied with alcohol. It may be heated by a coil of steam-pipe placed in the vessel, or by applying steam around the outside under a steam-jacket arranged for that purpose.

B is a pipe to conduct the alcohol from the vessel A to the pump C, which forces the alcohol through the pipe D into the vessel or cistern E, at or near the bottom among the sugar to be washed or refined. The piston of the pump C is provided with a valve opening downward, as shown by dotted lines, so that when it is forced down the valve will close and force the alcohol through the pipe D into the vessel E, at or near the bottom. The pipe D is provided with a valve, (shown in dotted lines,) to prevent the return of the alcohol when the piston of the pump is raised. The vessel E is provided with a cover, which should be fitted and fastened steam-tight and provided with a stuffing-box around the stirrer-shaft F, which passes through the cover and is fitted to turn on the bottom or on a pivot in the bottom of the vessel E, as shown by dotted lines in the drawing. The arms G G of the stirrer, which agitate the sugar, are also shown by dotted lines.

H is a pipe for the escape of the alcohol after it has passed up through the mass of sugar, carrying off the coloring-matter, molasses, &c., which the sugar may contain; and the white liquor with which the sugar is washed, after it has been washed with alcohol, may pass off through the pipe H, or through a similar pipe provided for that purpose.

The sugar, after being washed, may be drawn off through the pipe I, or the cover may be removed and the sugar dipped out.

The stirrer may be operated by a crank-pulley or gear, as may be most convenient.

The pipes and pump used to supply alcohol to the vessel E, and also the vessel E may be provided with steam-jackets, so as to be heated by steam, if desired.

To refine or purify sugar by my improved process, I fill the vessel E (heretofore described) with the crude sugar to be refined, and then force alcohol (from seventy-five to ninety-five per cent. proof, heated from 75° to 150° Fahrenheit) into the vessel among the sugar by means of a pump or otherwise, so as to fill all the interstices betweeen the grains or particles of sugar, and at the same time stir or agitate the mixture, and continue forcing in the alcohol, which has far more affinity for the impurities and extraneous matter mixed with the sugar than it has for the sugar; besides, most of the impurities and extraneous matter are lighter than the sugar, and are therefore carried up out of the sugar by the alcohol and floated off over the sides or top of the vessel with any other substance which is heavier than the sugar, and which has been dissolved by the alcohol, leaving nothing in the vessel E but pure sugar and alcohol.

To remove the alcohol from the sugar, it may be washed with a strong solution of sugar and water; or, if it is desirable to make the sugar coarse-grained, a little water may be added to the alcohol and sugar and the whole boiled and regrained.

The alcohol which runs over the top of the vessel with the impurities and extraneous matter may be redistilled and the alcohol recovered to use again, leaving the molasses in the still, which may be drawn off and barreled for use.

I contemplate that the alcohol may be supplied to the vessel E by a pipe entering at the top and passing down inside of the vessel, and by forcing the alcohol up through openings in the bottom of the vessel or through openings in a pipe coiled in the bottom of the vessel, it may be made to stir the sugar in part at least, if it will not stir it enough to answer the purpose; also, that any foul sugar may be refined or purified by my improved process, and that for very foul sugar alcohol of very high proof is best.

By the term "white liquor" I mean water saturated or partially saturated with white sugar.

I believe I have described the improved process which I have invented or discovered so as to enable any person skilled in the art to use it for refining or purifying sugar. I will now state what I desire to secure by Letters Patent.

I claim—

Applying alcohol, white liquor, or other liquid used to wash the sugar at or near the bottom of the vessel containing the sugar, and making the alcohol or other liquid to flow up through the mass of sugar and carry up, float out, and carry off any impurities and extraneous matter lighter than the sugar, and such other matter or substances as may be dissolved by the alcohol, white liquor, or other liquid used to wash the sugar, substantially as described.

JOHN WRIGHT, JR.

Witnesses:

J. DENNIS, JR.,

JOHN S. HOLLINGSHEAD.